United States Patent
Hughes

(10) Patent No.: US 8,451,331 B2
(45) Date of Patent: May 28, 2013

(54) AUTOMOTIVE SURVEILLANCE SYSTEM

(76) Inventor: Christopher L. Hughes, Columbus, OH (US)

( * ) Notice: Subject to any disclaimer, the term of this patent is extended or adjusted under 35 U.S.C. 154(b) by 1460 days.

(21) Appl. No.: 11/695,141

(22) Filed: Apr. 2, 2007

(65) Prior Publication Data

US 2008/0204555 A1    Aug. 28, 2008

Related U.S. Application Data

(60) Provisional application No. 60/891,680, filed on Feb. 26, 2007.

(51) Int. Cl.
*H04N 7/18* (2006.01)

(52) U.S. Cl.
USPC ........... 348/148; 348/143; 348/152; 340/937; 340/541

(58) Field of Classification Search
USPC ......................... 348/148, 152–154; 340/541
See application file for complete search history.

(56) References Cited

U.S. PATENT DOCUMENTS

| | | | |
|---|---|---|---|
| 4,904,983 A | 2/1990 | Mitchell | |
| 6,002,326 A | 12/1999 | Turner | |
| 6,693,563 B2 | 2/2004 | Flick | |
| 6,753,764 B2 | 6/2004 | Kuo | |
| 7,050,089 B2 | 5/2006 | Nakamura | |
| 7,129,838 B2 | 10/2006 | Shimomura et al. | |
| 2002/0005440 A1* | 1/2002 | Holt et al. | 239/284.2 |
| 2002/0008758 A1 | 1/2002 | Broemmelsiek et al. | |
| 2003/0067542 A1* | 4/2003 | Monroe | 348/148 |
| 2003/0095039 A1 | 5/2003 | Shimomura et al. | |
| 2004/0193371 A1* | 9/2004 | Koshiji et al. | 701/211 |
| 2004/0203577 A1 | 10/2004 | Forman et al. | |
| 2005/0128295 A1 | 6/2005 | Addy | |
| 2005/0242948 A1 | 11/2005 | Tarr | |
| 2006/0019633 A1 | 1/2006 | Capone | |
| 2006/0109341 A1 | 5/2006 | Evans | |
| 2006/0171704 A1* | 8/2006 | Bingle et al. | 396/419 |
| 2006/0261931 A1 | 11/2006 | Cheng | |

* cited by examiner

*Primary Examiner* — Mohamed Ibrahim
(74) *Attorney, Agent, or Firm* — Ronald J. Koch

(57) ABSTRACT

A motor vehicle monitoring system comprises controller 100, processor 110, memory 120, wireless transceiver 200, audio recording device 300, video recording device 400, information storage device 500, vehicle tracking device 600, video display device 700, and stimulus sensing device 800.

20 Claims, 2 Drawing Sheets

AUTOMOTIVE SURVEILLANCE SYSTEM

CLAIM OF PRIORITY BASED ON COPENDING PROVISIONAL APPLICATION

The present application is related to the Provisional patent application No. 60/891,680 of Christopher L. Hughes, filed Feb. 26, 2007, entitled "Automotive Surveillance System", and based on which priority is herewith claimed under 35 U.S.C. 119(e) and the disclosure of which is incorporated herein by reference in its entirety as if fully rewritten herein.

BACKGROUND AND SUMMARY

The present invention is in the field of automobile surveillance and solves the problem of surveillance in automobiles when the user is away. Upon the occurrence of an event such as a break in, car door being slammed into owners car, vandalism (key scratches), etc, the invention records, stores, and transmits relevant information, and alerts the owner of the event. The owner can continue to monitor in real time as well as view recorded data of the event. Moreover, the user can also monitor the information being recorded (video, audio) remotely any time without the occurrence of the security event.

The invention generally comprises one or more cameras mounted on the automobile (interior or exterior), either stationary or capable of moving; possible camera placements include, within exterior mirror housings, on the license plate brackets (to facilitate rear viewing), interior—where the seatbelt hooks on to the frame of the car, one or more microphones (interior or exterior);

a motion detection system;
a tracking system to track a moving object;
a recording system to record video and audio;
a storage system capable of storing the recorded information;
a video display located in the automobile and/or remotely via hand held device to display the recorded information; a wireless communication system capable of transmitting the recorded information; an indicator to alert the owner that an event has occurred; capability for the user to continue to monitor if vehicle is stolen (user could view thief through the camera and have the ability to disable/turn off the car);
video/audio recording is synchronized to the location on the car of the event and recording begins there;
the object is tracked if moving, otherwise, system waits for movement; the purpose thereof is to prevent recording unwanted information;
the system will utilize state of the art compression/storage techniques to efficiently transmit the electronic information to storage means and/or user device;
the system will decide what to send thus eliminating sending unwanted information;
the system will be optimized for highly relevant video recording areas such as license plate elevation, and human head elevation;
the user has the ability to control cameras and recording remotely;
the system allows for the user to change destination information on the fly (e.g. switch between cell phones, pda's, computer, or 3rd party monitoring service), the user can make these changes remotely;
the system allows for the user to provide the transmitter and/or to switch between transmitting sources (e.g. user buys new cell phone and wants to convert old cell phone to transmitter, the user simply installs (e.g. downloads) the necessary software, the software takes care of initializing the system), the invention has blue tooth (or similar) technology to allow it to use the new device and to communicate with peripherals (cameras, microphones), the user provided device must have the capability of wireless (cellular, etc.) communication;
video recording should have ability to record in low light situations utilizing infrared or other known means;
any exterior cameras should have means for cleaning themselves off from dirt, snow, rain, etc, this can be accomplished by a mechanical wiper, or fluids such as water or air;
the user will have the ability to log on (so to speak) to monitor remotely even when there is no event;
the location and placement of the cameras would be such that the field of view is maximized in all directions; the same is true for the microphones;
the motion detection system could be video based (e.g. monitors pixel changes), using movement (e.g. ultrasonic or radio frequency), sound/audio, or vibration;
the tracking system can track a moving object; e.g. a car door hits the owner's car and the system would track the car as it moves away while recording video, or the system could monitor the car and re-start recording upon the leaving of the car;
the recording system would be video or still frame and capable of low light recording (e.g. infrared);
the storage system is capable of storing the recorded information in the appropriate format, an added advantage of remote storage: would not loose the data if the car were stolen, the data would be uploaded before or while the car was in motion, there could be a local and remote storage systems;
the video display could be located in the automobile and/or remotely via hand held device (e.g. key chain or keyless entry, cell phone, pda, other) to display the recorded information;
the wireless communication system should be capable of transmitting the recorded information in the appropriate format (e.g. cellular, email, text mail, rss feed, sms, or other communication method), the method depends on what is being transmitted—e.g. text mail cannot transmit video, the video could be transmitted as streaming video (real time or otherwise), or file transfer for remote execution;
an indicator serves the purpose of alerting the owner that an event has occurred; it could be part of the navigation system; the indicator function could be a dedicated piece of hardware (e.g. light) or a software based event (flashing icon, etc.).

DETAILED DESCRIPTION OF PREFERRED EMBODIMENTS

Figure 1:
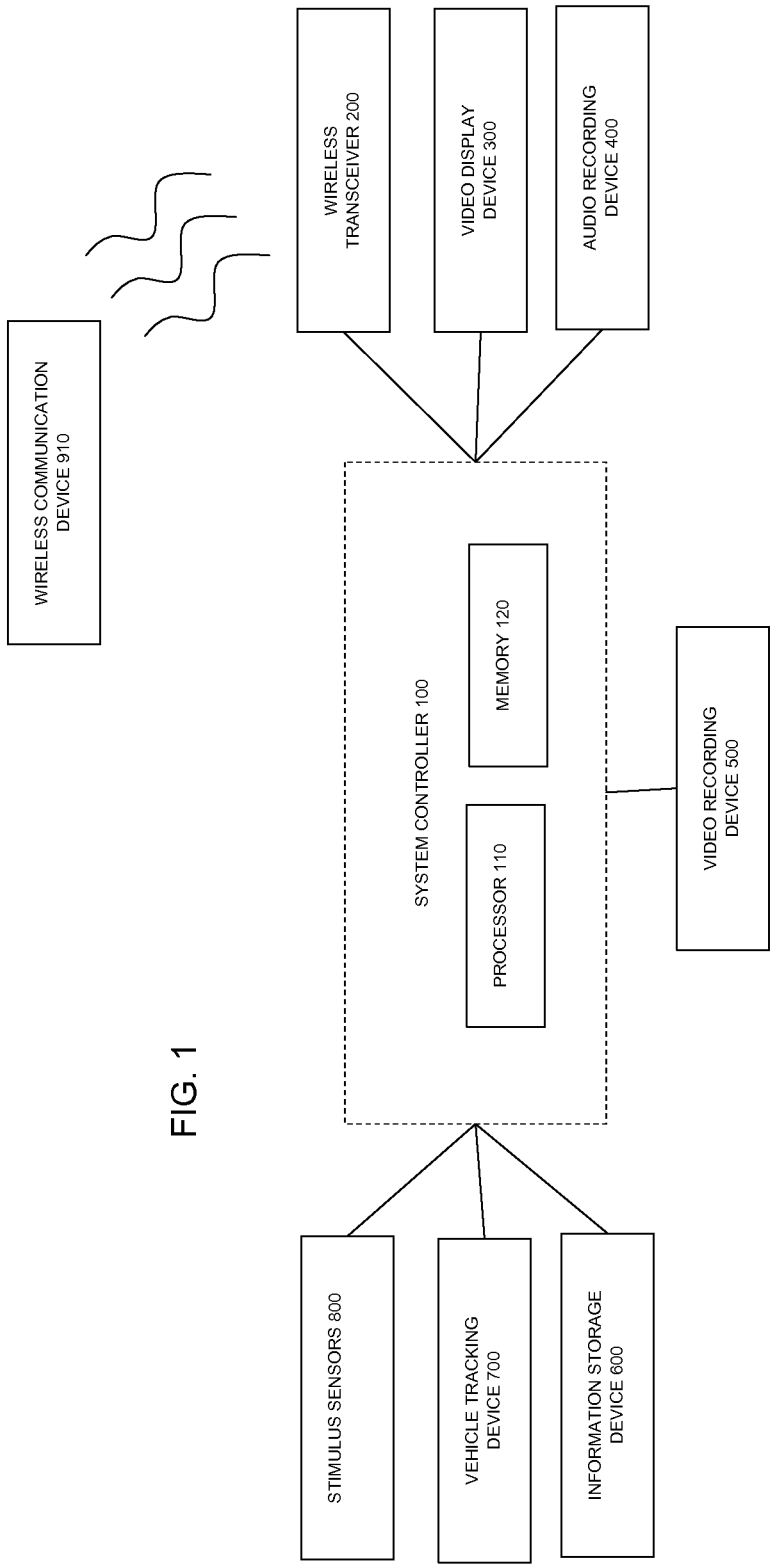
FIG. 1 is a block diagram depicting a preferred embodiment of the present invention.

Referring to FIG. 1, there is provided a block diagram of a preferred embodiment. The system controller 100 contains a processor 110, and memory 120. Processor 110 and memory 120 execute software instructions to accomplish the invention.

The system controller 100 interfaces with a wireless transceiver 200, an audio recording device 300, a video recording device 400, an information storage device 500, a vehicle tracking device 600, a video display device 700, and a stimulus sensing device 800. As will be apparent, some of the components (i.e. peripherals) of the present invention are necessary. For example, the invention could have only video monitoring equipment and not include the ability to monitor audio or vibration. Such an embodiment is possible, but not preferred.

The system controller 100 can filter out irrelevant information not related to the triggering event, compress all information before transmission or storage, and has a dormant power saving mode. The system controller 100 will awake from the dormant mode when the user remotely communicates with the motor vehicle monitoring system or an audio recording device 300, a video recording device 400, or a stimulus-sensing (i.e. vibration sensing) device 800 detects a triggering event.

The triggering event can be selectively chosen and fine tuned or calibrated. The user can decide that certain events do not qualify as an event that would trigger the system. For example, perhaps the user routinely parks in an area where loud music is played. The user does not want to be alerted unnecessarily so he or she creates a profile wherein audio events do not trigger the system. Upon leaving that area, the user can switch to a different profile specifically tailored to another location or situation.

The wireless transceiver 200 is capable of communicating over wireless communication channels using a variety of protocols including, but not limited to, CDMA, GSM, Bluetooth, and Wi-Fi (IEEE 802.11a, 802.11b, 802.11g, 802.11n). The status and settings of the motor vehicle monitoring system can be ascertained and modified through the wireless channel via a wireless device specifically designed for the control of the system or utilizing another wireless communication device not designed for the system. The latter necessitates implementing executable software instructions by methods described herein throughout.

Every aspect of the system can be controlled by the user through a variety of common electronic devices including cellular phones, PDAs, pagers, computers, or any other devices with the ability to communicate over the wireless channel.

Audio recording device 300 comprises one or more common microphones (or other suitable means for transducing sound) mounted on the interior or exterior of the vehicle and positioned to maximize the field of recording. The microphones are permanently mounted with fasteners or temporarily mounted with magnets, or the like.

The audio recording device 300 records automatically when a triggering event occurs and the user can manually trigger recording through a wireless communication device. This is true for the other peripherals as well.

Video recording device 400 comprises one or more video cameras mounted on the interior or exterior of the vehicle and positioned to maximize the field of recording. The video recording device 400 pans automatically to track movement and enables the user to pan manually through local control or remotely using a wireless communication device. It is apparent the a video recorder does not have to have the ability to pan, but doing so is advantageous.

The video recording device 400 records automatically when a triggering event occurs. The user can manually trigger recording through a wireless communication device.

Video recording device 400 adjusts automatically to the ambient light and weather conditions. Infrared technology allows the video recording device 400 to adjust to low light conditions. The video recording device 400 automatically adjusts for the weather conditions using an automatic cleaning device on the lens and the capability of automatically enabling a defroster when necessary. The automatic cleaning device can incorporate a number of technologies including a mechanical wiper, pressurized air, and pressurized liquid.

The information storage device 500 can be a stand alone in-vehicle electronic storage device or an in-vehicle electronic storage device working in combination with a remote electronic storage device that mirrors the contents of the in-vehicle electronic storage device. A variety of formats of storage can be used including a hard drive, a tape drive, or a flash drive. The storage device is in electrical or electromechanical communication with the system controller. This can be accomplished by hard wiring (e.g. direct wire, USB, firewire, pci).

The motor vehicle monitoring system enables the user to access the contents of all information storage devices 500 locally inside the vehicle or remotely via a wireless communication device.

The vehicle tracking device 600 will track the vehicle location through the vehicle's existing navigation system, a GPS system integrated into the motor vehicle monitoring system, a GPS enabled cell phone, a third party GPS navigation device, or cellular tower triangulation. The user can access the location of the vehicle at anytime through a wireless communication device.

The video display device 700 can be integrated into the dashboard of the vehicle, can be a hand held device capable of wireless communication, or can be a hand held device capable of wireless communication that can be docked in the vehicle. The video display device 700 enables the user to completely control the vehicle monitoring system, view the status of the system, watch real time video from the video recording device 400 or stored video from the information storage device 500. Additionally, the video display device enables the user to monitor real time audio from the audio recording device 300 or saved audio from the storage device 500.

The stimulus-sensing device 800 can be a single sensor that monitors for one specific stimulus or a combination of sensors that monitor for multiple stimuli such as motion, vibration, or perimeter intrusion. The system enables the user to check the status of the stimulus-sensing device through a remote wireless device.

Figure 2:
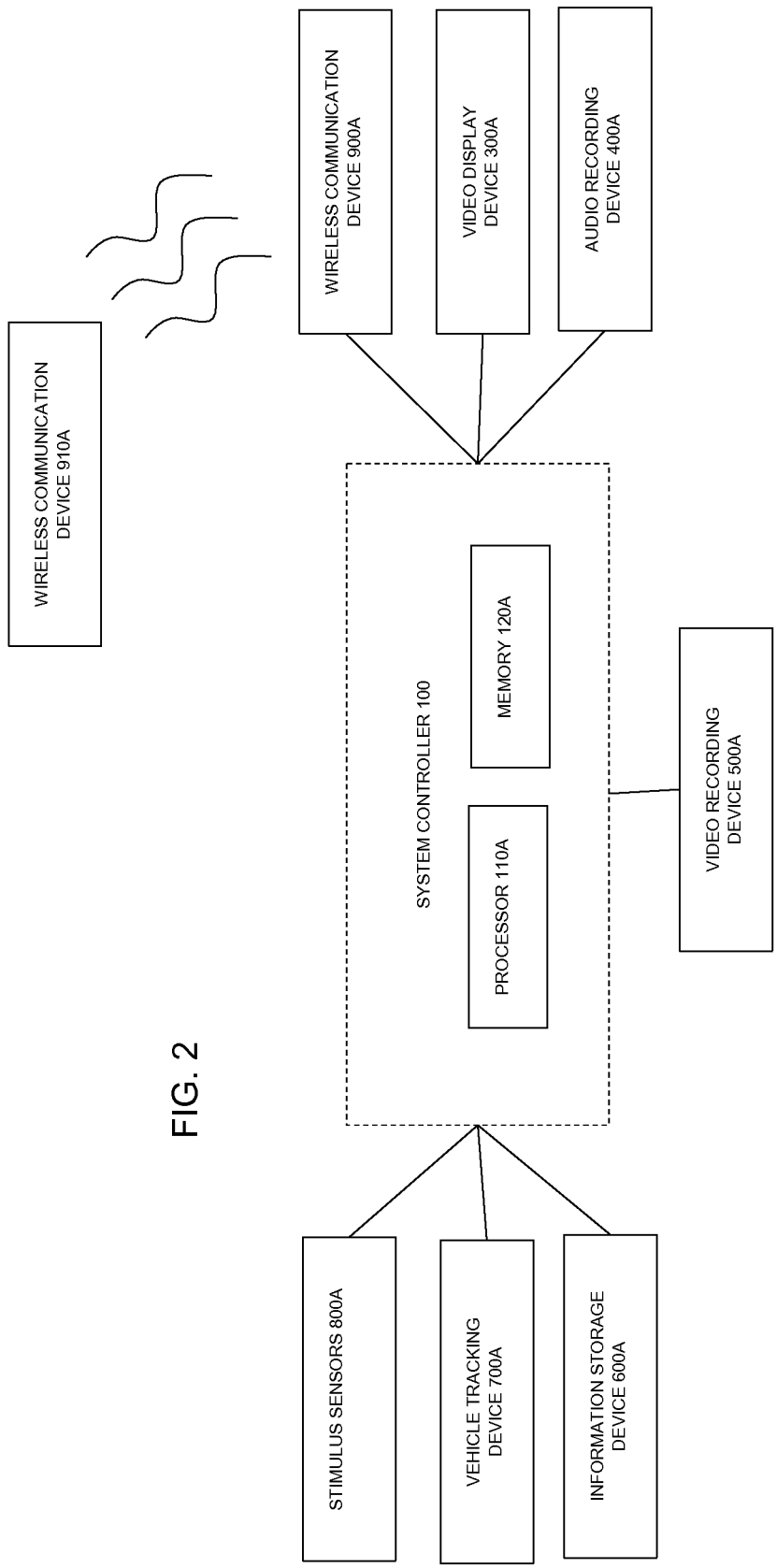
FIG. 2 is a block diagram depicting a preferred embodiment of the present invention.

Referring to FIG. 2, there is provided a block diagram of a preferred embodiment. The system controller 100A contains a processor 110A and memory 120A. Processor 110A and memory 120A execute software instructions to accomplish the invention. Aspects of this embodiment relating to the monitoring of video, audio, and vibration as well as the communication of associated data as well as remote control are analogous to systems and methods described for other embodiments throughout.

The system controller 100A enables the motor vehicle monitoring system to interface with and be controlled by a user provided wireless communication device 910A located remote to the vehicle. Device 910A communicates with a second wireless communication device 900A located approximate the vehicle. A distinctive advantage of the present invention is achieved by allowing the user to switch, or selectively choose, a wireless communication device to replace devices 900A and 910A. Existing systems are limited by the wireless communication device approximate the vehicle being inextricable embedded within the hardware of the system. Therefore, the user cannot control the device used. The present invention is advantageous because the user can choose. For example. Suppose a user buys a new cell phone (i.e. wireless communication device) and decides to use his or her old cell phone in the invention. The user simply installs the necessary software (by downloading and installing or the equivalent thereof) on the old phone and interfaces with the system controller 100A instructing it to utilize the old phone as the new local wireless communication device. The user would perform a similar operation to designate the newly purchased phone as the remote communication device. The foregoing is highly advantageous because the present invention can take advantage of superior performance and features of new equipment that becomes available on the market.

The wireless communication devices chosen by the user must be capable of executing the necessary software instructions. Methods are known in the art for providing downloadable software programs for installation and execution on wireless communication devices.

The motor vehicle monitoring system enables the user to control the system through the use of any of the previously listed wireless communication devices. The wireless communication devices send and receive electronic information relating to the monitoring of the motor vehicle through a wireless communication channel using a variety of protocols including, but not limited to, CDMA, GSM, Bluetooth, and Wi-Fi (IEEE 802.11a, 802.11b, 802.11g, 802.11n). The wireless communication device can be a touch pad interface built into the car, cellular phone, PDA, personal computer, or any other device that is able to communicate over the wireless protocol. Due to the flexibility of the system, the user can choose to communicate with the vehicle monitoring system via any wireless device that supports the required protocol. Additionally, the flexibility of the vehicle monitoring system enables the user to switch from one wireless communication devices to another on the fly.

The various peripherals that serve to record audio, video, and vibration in the various embodiments as described herein throughout have certain characteristics that are common to all of the embodiments described herein throughout; the peripherals are in electrical or electromechanical communication with a system controller; it is apparent that various means of communication can be used such as hard wiring, Bluetooth, or other wireless means; the peripherals can be physically relocated or removed; certain types of information can be selectively removed from the system (e.g. the ability to record audio) without compromising the efficacy of the remaining system.

What is claimed is:

1. A motor vehicle monitoring system comprising:
   a system controller interfacing with a wireless transceiver, an audio recording device, a video recording device, an information storage device, a vehicle tracking device, a video display device, and a stimulus sensing device;
   a computer processor and computer memory including software instructions that cause said monitoring system to perform the steps of,
   detecting an event according to predetermined instructions and storing information in the information storage device according to said predetermined instructions;
   said predetermined instructions being selectively chosen from one or more profiles, each profile being specifically tailored to a particular environment;
   notifying a user of said event by sending electronic information through a wireless communication channel;
   enabling a user to monitor any of said recording devices;
   enabling a user to remotely control said monitoring system;
   enabling a user to monitor said motor vehicle in real time or with pre-recorded data;
   wherein said system controller compresses all information before storage;
   wherein said system controller compresses all information before transmission;
   wherein said system being capable of being remotely controlled;
   said video recording device having automatic mechanical cleaning means;
   said video recording device being capable of adjusting automatically for ambient light conditions;
   said audio recording device being capable of automatic enablement upon movement detection;
   said video recording device being capable of automatic enablement upon movement detection;
   said video recording device being capable of panning;
   said video recording device being capable of panning automatically to track movement;
   said video recording device being capable of panning manually to track movement;
   said video recording device being capable of remote control by a user;
   said video recording device being capable of automatically defrosting;
   said video recording device being mounted to optimize viewing and recording of automobile license plates and pedestrians;
   said information storage device being capable of storing information in electronic form;
   whereby a motor vehicle may be remotely monitored.

2. The system of claim 1 further comprising:
   said automatic mechanical cleaning means comprises a mechanical wiper.

3. The system of claim 1 further comprising:
   said automatic mechanical cleaning means comprises utilizing pressurized air.

4. The system of claim 1 further comprising:
   said automatic mechanical cleaning means comprises utilizing pressurized liquid.

5. The system of claim 1 further comprising said video display device being mounted in said vehicle.

6. The system of claim 1 further comprising said video display device being hand held.

7. The system of claim 1 further comprising said information storage device being located in said vehicle.

8. The system of claim 1 further comprising said information storage device being located remote to said vehicle.

9. The system of claim 1 further comprising:
   said vehicle tracking device comprises the existing navigation system of said vehicle.

10. The system of claim 1 further comprising:
    said vehicle tracking device comprises a GPS system.

11. The system of claim 1 further comprising:
    said vehicle tracking device comprises utilizing cellular tower triangulation.

12. The system of claim 1 further comprising:
    said stimulus sensors of said monitoring device comprise motion sensors.

13. The system of claim 1 further comprising:
    said stimulus sensors of said monitoring device comprise vibration sensors.

14. The system of claim 1 further comprising:
    said stimulus sensors of said monitoring device comprise perimeter intrusion sensors.

15. The system of claim 1 further comprising:
    said audio recording device comprises a plurality of audio recording devices;
    said video recording device comprises a plurality of video recording devices;

said stimulus sensing device comprises a plurality of stimulus sensing devices;
said audio recording devices are placed to maximize the audio recording field;
said video recording devices are placed to maximize the video recording field.

16. The system of claim 1 further comprising:
said system controller being capable of entering a dormant mode during periods of inactivity.

17. The system of claim 1 further comprising:
said audio recording device being mounted on the exterior of said vehicle.

18. The system of claim 1 further comprising:
said audio recording device being mounted on the interior of said vehicle.

19. The system of claim 1 further comprising:
said video recording device being mounted on the exterior of said vehicle.

20. The system of claim 1 further comprising:
said video recording device being mounted on the interior of said vehicle.

* * * * *